United States Patent [19]
Bouldin et al.

[11] Patent Number: 5,121,131
[45] Date of Patent: Jun. 9, 1992

[54] INSTANT HIGH CONTRAST IMAGING SYSTEM

[75] Inventors: Eric W. Bouldin, Atherton; Brad W. Dreisbach, Sunnyvale, both of Calif.

[73] Assignee: Drexler Technology Corporation, Mountain View, Calif.

[21] Appl. No.: 428,521

[22] Filed: Oct. 30, 1989

[51] Int. Cl.$^5$ .................... G01D 15/16; H04N 1/21; B41M 5/00

[52] U.S. Cl. .................... 346/1.1; 346/75; 346/140 R; 346/135.1; 358/296; 101/463.1

[58] Field of Search ............ 346/1.1, 135.1, 75, 346/140 R; 430/265, 269, 943; 358/296; 101/463.1

[56] References Cited

U.S. PATENT DOCUMENTS

| | | | |
|---|---|---|---|
| 4,694,302 | 9/1987 | Hackleman et al. | 346/1.1 |
| 4,753,864 | 6/1988 | Bouldin et al. | 430/273 |
| 4,770,967 | 9/1988 | Vackier | 430/102 |

Primary Examiner—Benjamin R. Fuller
Assistant Examiner—Gerald E. Preston
Attorney, Agent, or Firm—Schneck & McHugh

[57] ABSTRACT

A system and method of creating transmissive images in a developed photographic film is disclosed. A light-sensitive silver halide emulsion is developed to form an opaque surface layer of fine silver grains with a clear underlayer supported on a transparent substrate. Transmissive images are created in the opaque surface layer by selectively applying an oxidizing solution which oxidizes the silver grains to silver ions which are poor absorbers of light. The underlayer absorbs excess oxidizing solution with little or no swelling. The oxidizing solution may be dispersed by a modified ink-jet printer. The imaged film has high contrast and can be directly used without further processing in color printing plate making systems and other applications requiring a transmissive film or mask.

16 Claims, 2 Drawing Sheets

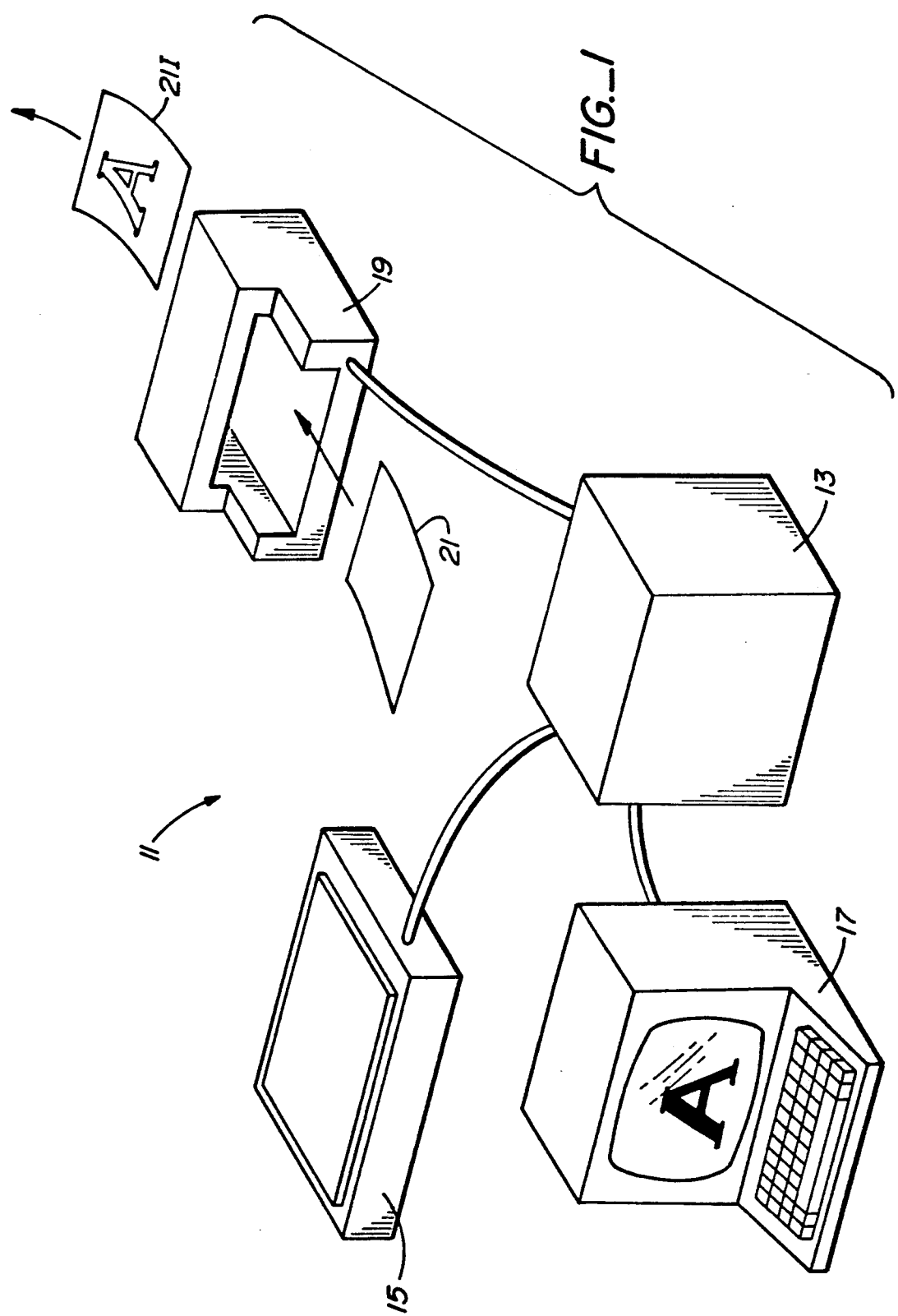

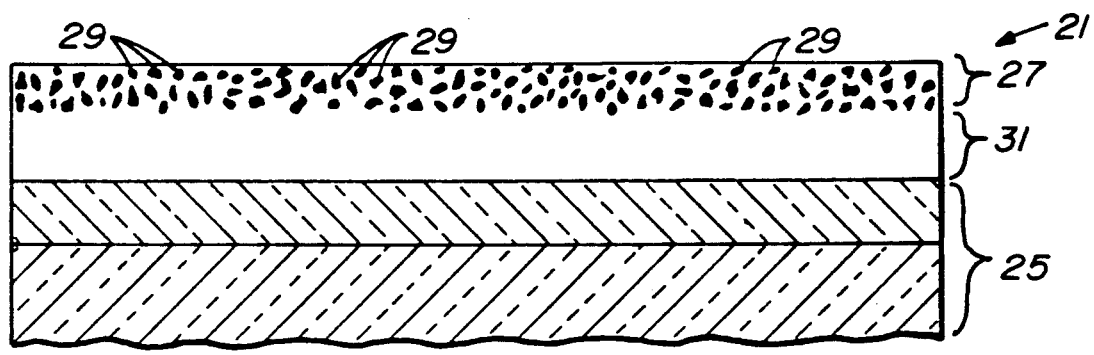
FIG._2
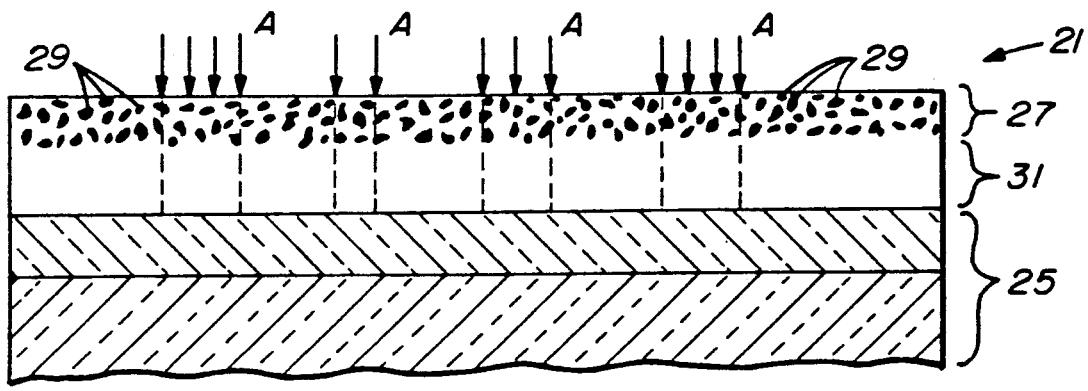
FIG._3
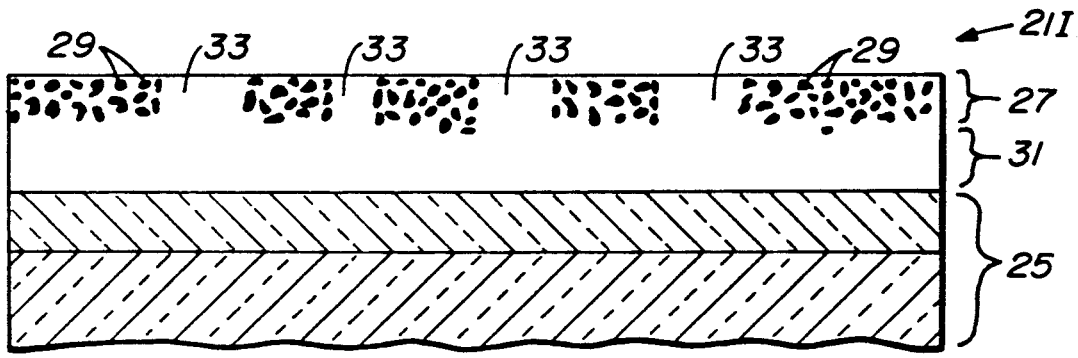
FIG._4
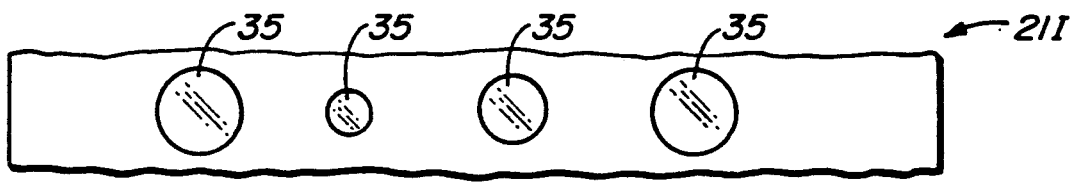
FIG._5

INSTANT HIGH CONTRAST IMAGING SYSTEM

TECHNICAL FIELD

The invention relates to direct imaging systems and particularly to instant transmissive imaging of photographic film.

BACKGROUND ART

Films bearing transmissive images have become an increasingly important sector of photography, particularly in the fields of printing, semiconductor manufacturing and archival storage. In these fields, cost, processing time and image sharpness are major concerns Prior imaging methods have relied upon exposing a light-sensitive film and then developing the film using chemical developers and the like. This can be both costly, time consuming and require complicated equipment. While the present invention has application in many fields, it will be discussed with particular application in the field of printing Printed materials are and continue to be a very important medium for disseminating information. Recent advances in computer hardware and software have made it possible for what has become known as desktop publishing. With a desktop publishing system, one can create and combine, text and graphics to form good quality printed materials at one's desk. Prior to desktop systems, one had to take their text and art work to a typesetter and graphic illustrator, who would lay-out and paste-up the work. After several processing steps, copies of the work were printed using either a printing press or a photocopier. This was often expensive and time consuming, since many of the steps were done by hand. Computers are now able to do much of that work so that one with little experience or training can put together well laid-out material. However, to make several copies of the material, an outside copy service is often needed. Indeed, if a large number of copies are needed, or if high quality or other special needs are desired, the work is sent out to a professional printshop. Color printing is often one of the special needs which requires that the work be sent out for printing.

Using color in printed materials has increased dramatically with the increased use of color computer systems. People now want color prints of color images produced by computers. Many various systems and techniques have been developed to satisfy this need for color printing.

One such system involves color separation. When a color illustration or picture is printed, all the colors in it are produced by just four inks. These are the three secondary colors: yellow, magenta and cyan; and black. Each ink is printed by a separate printing plate. Producing these plates involves two processes, color scanning and typesetting. Color scanning breaks the illustrations down into the three secondary colors and black, while typesetting converts the text into print.

A color scanner breaks down each illustration into four separate images which together will re-create the full-color picture In each separation, the picture is broken up into many separate dots. A computer in the scanner controls the size of the dots, producing larger or more numerous dots where the color must be dense and smaller or fewer dots in other parts of the separation. Breaking the picture up into dots enables the printing plate to print any color at any intensity.

Color scanning is sometimes accomplished by placing the color picture on a scanning drum. The picture, either a color transparency or piece of art work, rotates on the scanning drum. An optical system moves across the picture, detecting its color and brightness and breaking them down into a large number of dots. Signals from the optical system go to the scanner's computer where they are stored.

To produce the printing plates, either a negative or positive film is used. Using the stored signals from the scanning operation, the computer generates signals to operate a recording drum. Film is placed around the drum, which rotates. Typically a computer-controlled laser beam is used to move across the film to create four separations made of lines of dots. The yellow, magenta and cyan separations are black-and-white images formed by the amounts of each color in the original picture The black separation is an ordinary black-and-white image of the picture. The lines of dots are scanned at different angles to prevent patterns becoming visible in the printed picture After being imaged by the laser beam the film is developed, fixed, washed and dried.

To make a printing plate of the black separation, a plate is coated with a light-sensitive substance. Light is shown through the combined films of the text and the black separation to expose the plate, which is then developed so that the text and picture form in the coating. The plate is then treated with chemicals, which penetrate parts of the coating and create the text characters and picture dots on the plate. The kind of chemical treatment depends on whether the plate is for letter press, gravure or litho printing. Three more printing plates are then made from the other color separations in the same way. Therefore, each page that is to be printed in color requires at least four different sheets of imaged film. Once made the printing plates may then be used in a printing press to produce high quality copies of the material.

While systems of this type produce high quality material, the expense of such systems can be more than most desktop publishers can reasonably afford. Therefore, a significant amount of color print work continues to be sent out to outside printshops. Indeed, filling the increasing demand for color printing has become a highly competitive field, so that even small cost advantages are of major import. Another important consideration is the speed at which a system prints. Thus, reducing the processing time in a printing system is important.

Therefore, it is an object of the present invention to design a system and method for producing high contrast, instant transparent images.

It is another object of the present invention to reduce the cost of printing systems and their operating expenses.

It is yet another object of the present invention to simplify the steps required to produce either a negative or positive film used to make a printing plate.

SUMMARY OF THE INVENTION

The above objects are achieved by an imaging system in which portions of an opaque developed film are selectively oxidized with an oxidizing solution to form transmissive areas in the film. The film has an opaque layer of fine silver grains supported on a clear underlayer and a transparent substrate The oxidizing solution is highly concentrated and is applied to just those portions of the film in which a transmissive image is desired. In those portions of the film in which the oxidizing solution is applied, the silver grains are oxidized to a silver ion which is a poor light absorber, thus creating a transmissive image.

Various means may be employed to selectively apply the oxidizing solution to the surface of the film. One such means, which has proven successful, is use of an ink-jet printer in which oxidizing solution is dispersed rather than ink. The ink-jet printer is computer-controlled to direct very fine droplets of the oxidizing solution onto the film at the selected areas where a transmissive image is desired. Either a negative or positive image can be produced in this manner. The resultant imaged film requires no further processing because the oxidizing reactions happen in just a few milliseconds and the excess water of the solution and reactions is readily absorbed by the underlayer with little or no swelling, leaving the film surface substantially dry. Thus, the film can be used directly for many various applications.

One application of particular interest is in printing plate making As noted previously, color separations are often used in color printing which require a separate printing plate for each color. Generally four colors of ink are used to create a full color print. A common method used to make a printing plate is to expose a photosensitive plate through a transmissive film and thereafter process the plate using chemical etching techniques. This means that four film sheets need to be imaged and developed, one for each color. However, the present invention produces instant film sheets which can be used directly in a printing plate making system. This means that the various development solution baths and steps for processing the film can be eliminated. This not only simplifies the imaging process and apparatus needed for color printing, but reduces the operating cost and the processing time.

Other applications of the present invention include instant microfilm and microfiche, and photomasks for semiconductor manufacturing, etc. In each of these applications there is a cost savings due to the small amount of oxidizing solution that is needed, since it is highly concentrated and since the silver layer is very thin. Moreover, since the silver layer is very thin, less than one micron, very little silver is needed in the film itself, thus reducing its cost.

BRIEF DESCRIPTION OF THE DRAWINGS

FIG. 1 is an illustrative view of an imaging system in accord with the present invention.

FIG. 2 is an enlarged cross sectional view of the film sheet of FIG. 1 prior to imaging.

FIG. 3 is a cross sectional view of the film sheet of FIG. 2 as imaging begins.

FIG. 4 is a cross sectional view of the film sheet of FIG. 3 after completion of imaging.

FIG. 5 is a top view of the film sheet of FIG. 4.

BEST MODE FOR CARRYING OUT THE INVENTION

Referring to FIG. 1, an imaging system 11 is shown wherein imaging data is entered into a computer 13 via an optical scanner 15 or a keyboard 17. The imaging data may be modified and stored in the computer 13 or other memory device, not shown. The computer 13 is signally connected to a modified ink-jet type printer 19 which is used to create transmissive images in a developed film sheet 21. Once imaged the film sheet 21I is ready to be used in an application, such as in making printing plates.

The optical scanner 15 may be of the type which makes color separations from a scanned object. The color separations are preferably the secondary colors yellow, magenta and cyan. The scanner 15 can be used to scan either artwork or text. The image data created by scanning is converted into a bit map of lines of dots, or for the text, optical character recognition (OCR) software may be used to "recognize" the text and convert it into a text file. A digital camera may take the place of the optical scanner 15 in the system 11. The camera may be either a video or still camera which converts an image into digital signals that are stored as a bit map.

Text may also be entered into the computer 13 using the keyboard 17. Using graphic design software programs an operator can create his or her own artwork and graphics. The stored image data from the scanner can also be used or modified to form artwork. Other software programs can then be used to combine the artwork with the text. Thus, a composite of the text and graphics may be stored in the computer.

As noted previously the computer 13 controls the operation of the modified ink-Jet printer 19 in much the same manner as it would with a conventional ink-jet printer. Two of the differences are that the printer 19 disperses minute droplets of an oxidizing solution instead of ink and the recording medium is a specialized developed film sheet instead of paper. Since the oxidizing solution may be corrosive, some of the printer's parts should be made with non-corrodable materials. This is especially important in the printhead which contains very small nozzles and passageways that are easily clogged. Current desktop-size ink-jet printers have a resolution of 400 dots per inch (DPI). This level of resolution rivals the resolution of many laser printers and produces sharp text and graphics. Moreover, the transmissive dots produced using the modified ink-jet printer 19 and the film sheet 21 produces very circular and well defined dots. This increases the definition and sharpness of the transmissive image. These features are discussed more fully in relation to FIGS. 2-5.

Once the film sheet 21 is imaged it is ready to be used. While there are many applications for which the imaged film could be used, only printing plate making will be described To make a color print four or more different printing plates and ink colors are used. Preferably the ink colors are black, yellow, magenta and cyan. To make the printing plates four separate film sheets are needed, one for each ink color Stored in the computer 13 are image data for each of the four separations used to make an imaged film sheet for each color. The printing plates are made by placing one of the imaged film sheets 21I on a light-sensitive plate. Light is then shone through the film sheet to expose the plate, which is then developed so that the text and picture form in the coating The plate is then treated with chemicals, which penetrate parts of the coating and create the text characters and picture dots in the plate. This process is done for each of the printing plates.

Turning now to FIGS. 2-5, which illustrate the process by which a transmissive image is formed in a portion of the film sheet 21, shown in FIG. 1. FIG. 2 shows the beginning film prior to being imaged. The film has a transparent substrate 25 on which is supported a developed silver halide emulsion layer comprising a very thin surface layer 27 of silver grains 29 and a clear gelatin underlayer 31. Preferably the silver grains have an irregular spheroidal shape. However, other grain shapes are acceptable such as filamentary, tabular and cubic as long as the surface layer is thin and substantially opaque. Methods for creating and prerecording silver halide emulsion layers suitable for use in the present invention are described in commonly assigned U.S. Pat. Nos. 4,753,864 and 4,999,278, both of which are incorporated by reference.

The surface layer 27 is less than one micron thick and preferably about 0.5 micron. When the silver grains 29 have an irregular spheroidal shape, their average diameters are less than 0.1 micron and preferably between 0.03 and 0.07 micron. The surface layer 27 is opaque and appears dark. Preferably the layer 27 has an optical density greater than 1.0 to provide high contrast. Because the surface layer is created from a light-sensitive silver halide emulsion, it may be photographically prerecorded with indicia and control guides. This is an important feature and advantage, since in printing plate making control and alignment guides or marks are often employed on the transmissive films used to make the plates to aid with proper alignment.

The underlayer 31 is made of a clear gelatin that has a thickness of a few microns, preferably between 1 and 10 microns. The gelatin underlayer 31 should be able to absorb small amounts of water without significant swelling. The underlayer 31 is supported on the transparent substrate 25 which may be made of, by way of example, polycarbonate or similar plastic, or glass. The substrate may be either flexible or rigid depending on the intended use of the film sheet 21.

FIG. 3 depicts the beginning of the imaging process. Discreet amounts of an oxidizing solution represented by arrows A, are dispensed on the surface layer 27. The oxidizing solution has a high concentration of reagent which oxidizes the silver grains immediately below the surface contacted by the solution. The solution needs to be of adequate concentration to ensure that oxidation of the silver grains takes place through the entire surface layer 27. By oxidizing the silver grains, they are transformed back into a silver ion which is a poor light absorber. Water from this process is absorbed by the underlayer 31. The reaction takes about 30 milliseconds.

Potassium ferricyanide is a preferred reagent because over time there is little discoloration of the imaged areas. Further, potassium ferricyanide may be used without significantly modifying the ink-jet printer, since it does not corrode the print head. Other reagents may also be used such as ferric nitrate, sodium persulfate and potassium permanganate. Preferred concentrations are within 10% and 20% by weight. An advantage of the present invention is that very little oxidizing solution is needed. One cc of solution will clear out a 17 cm by 17 cm area.

FIGS. 4 and 5 illustrate the transmissive areas 33 that are created by the oxidation process in imaged film sheet 21I. These areas have an optical density of less than 0.1 giving the film a contrast ratio of at least 10 to 1. Moreover, the oxidizing solution tends to reduce the silver grains directly below the area contacted by solution and does not appear to spread out into the layer 27. Thus, the image areas 33 appear as image dots 35, shown in FIG. 5, which have an excellent circularity and sharp image. The image dots 35 may vary in size, as shown, or they may be of uniform size. A method for producing variable size dots with an ink-jet printer is disclosed in U.S. Pat. No. 4,281,333. Image dots 35 down to 25 microns in diameter have been produced using a simple atomizer. Images made up of dots of this size would give a resolution of about 1000 dots per inch (dpi). This level of resolution is comparable to the resolution of professional typesetting.

As previously discussed, a modified ink-jet printer can be used to disperse the oxidizing solution onto the film sheet. Tests conducted by the assignee using a Dionix ink-jet printer with a Hewlett Packard cartridge were performed with successful results. The printer was modified by replacing the ink in the ink cartridge with oxidizing solutions. The printer created dots with a diameter of about 150 microns. High contrast images of text and artwork were created using the modified ink-jet printer Indeed, refinements and improvements in ink-jet printer technology are anticipated to reduce the diameter of the dots produced with an accompanying improvement in resolution.

We claim:

1. A system for creating instant transmissive images in a film layer, the system comprising,
    a recording medium having a substantially opaque surface layer of fine grained silver and a clear underlayer,
    a supply of oxidizing solution,
    means for dispensing controlled amounts of the oxidizing solution, the means for dispensing being connected to the supply of oxidizing solution,
    positioning means for locating the means for dispensing proximate to the surface of the recording medium and for providing relative motion therebetween, and
    control means for operatively regulating the means for dispensing to dispense the oxidizing solution on selected areas of the surface of the recording medium, whereby a transmissive image is created therein, said control means including a computer and memory unit, the memory unit storing control and imaging information related to said selected areas.

2. The system of claim 1 further including scanning means for creating a bit-map image of an object, the bit-map image being modifiable by said computer, and being stored in said memory unit.

3. The system of claim 2 wherein said scanning means is a color scanner capable of forming color separations.

4. The system of claim 3 wherein said color separations include yellow, magenta, cyan and black.

5. The system of claim 2 wherein said scanning means is a digital camera.

6. A system for creating direct images in a developed film, the system comprising,
    a film sheet having a thin surface layer of fine grained silver and a clear underlayer supported on a transparent substrate, the thin surface layer being substantially opaque,
    a supply of oxidizing solution having a high concentration of potassium ferricyanide,
    an ink-jet printer connected to the supply of oxidizing solution for dispensing controlled amounts of the oxidizing solution onto selected areas of the surface layer of the film sheet, the ink-jet printer including a printhead and positioning means for providing relative movement between the printhead and the film sheet,
    control means operatively connected to the ink-jet printer for controlling the dispensing of the oxidizing solution, sheet feeding means for feeding the film sheet proximate the printhead, and means for inputting and storing a bit map of an image, the means for inputting and storing being connected to the control means and the selected areas of the film sheet being associated with the stored bit map.

7. The system of claim 6 wherein said control means includes a computer connected to the ink-jet printer.

8. The system of claim 7 wherein said means for inputting and storing include a keyboard for inputting text, a color scanner for producing color separations and a memory unit for storing bit maps of the separations, the keyboard, color scanner and memory unit being connected to a computer.

9. The system of claim 6 further including a printing plate making means for producing a printing plate using said film sheet.

10. A method for creating transmissive images in a developed photographic film, the method comprising the steps of, providing a film sheet having an opaque surface layer of silver grains and a clear gelatin underlayer supported on a transparent substrate, the surface layer having a thickness of less than one micron and having an optical density greater than 1.0, positioning the film sheet proximate to the print head of an ink-jet printer, supplying an oxidizing solution to the ink-jet printer for dispersion from the print head, controllably regulating the dispersion of the oxidizing solution in relation to stored image data, the oxidizing solution being dispersed onto selected areas of the film sheet to create an image associated with the stored image data thereby forming an imaged film sheet.

11. The method of claim 10 wherein said stored image data is derived from an optical device.

12. The method of claim 11 wherein said optical device is an optical scanner.

13. The method of claim 11 wherein said optical device is a digital camera.

14. The method of claim 10 wherein said stored image data is derived from inputs received from a keyboard.

15. The method of claim 10 further comprising the step of delivering said imaged film sheet to a point of use.

16. The method of claim 15 wherein said point of use is a printing plate making system.

* * * * *